US011493786B1

(12) United States Patent
Tham et al.

(10) Patent No.: US 11,493,786 B1
(45) Date of Patent: Nov. 8, 2022

(54) EYEWEAR WITH WEARER NOTIFICATION

(71) Applicants: Yu Jiang Tham, Los Angeles, CA (US); Jonathan M. Rodriguez, II, Los Angeles, CA (US)

(72) Inventors: Yu Jiang Tham, Los Angeles, CA (US); Jonathan M. Rodriguez, II, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 822 days.

(21) Appl. No.: 16/351,780

(22) Filed: Mar. 13, 2019

Related U.S. Application Data

(60) Provisional application No. 62/652,549, filed on Apr. 4, 2018.

(51) Int. Cl.
*G02C 11/04* (2006.01)
*G02C 11/00* (2006.01)

(52) U.S. Cl.
CPC .............. *G02C 11/04* (2013.01); *G02C 11/10* (2013.01)

(58) Field of Classification Search
CPC ...... G02C 11/04; G02C 11/10; G02B 27/017; G02B 27/0172; G02B 2027/0178; G06F 3/011; G06F 3/013
See application file for complete search history.

(56) References Cited

U.S. PATENT DOCUMENTS

| | | | |
|---|---|---|---|
| 2013/0214998 A1* | 8/2013 | Andes | G06F 3/0346 345/8 |
| 2016/0171772 A1* | 6/2016 | Ryznar | G06F 3/0346 345/633 |
| 2016/0209648 A1* | 7/2016 | Haddick | G06F 3/03547 |
| 2018/0088687 A1* | 3/2018 | Hanover | H04N 5/2253 |
| 2018/0091729 A1* | 3/2018 | Hanover | G03B 17/48 |
| 2018/0126116 A1* | 5/2018 | White | G02F 1/1334 |

\* cited by examiner

*Primary Examiner* — Orlando Bousono
(74) *Attorney, Agent, or Firm* — Culhane Meadows PLLC; Stephen J. Weed (57) ABSTRACT

An eyewear device is disclosed including a frame, a temple connected to a lateral side of the frame, an array of light emitting diodes (LEDs) to emit light patterns on an inner surface of the frame or the temple within a peripheral view of a wearer of the eyewear, a processor coupled to the eyewear device, and a memory accessible to the processor. The memory stores programming for execution by the processor and notification patterns corresponding to the LEDs. Execution of the programming configures the eyewear device to identify an event for presentation to the wearer, select a notification pattern corresponding to the identified event, and display the selected notification pattern to the wearer by selectively illuminating the LEDs.

18 Claims, 10 Drawing Sheets

EYEWEAR WITH WEARER NOTIFICATION

CROSS-REFERENCE TO RELATED APPLICATIONS

This application claims priority to U.S. Provisional Application Ser. No. 62/652,549 entitled EYEWEAR WITH WEARER NOTIFICATION, filed on Apr. 4, 2018, the contents of which are incorporated fully herein by reference.

TECHNICAL FIELD

The subject matter disclosed herein generally relates to the use of light emitting diode (LED) arrays to provide notifications of events to a wearer of an eyewear device.

BACKGROUND

Portable eyewear devices, such as smart glasses, headwear, and headgear available today integrate cameras and displays for multiple functions. The portable eyewear devices utilize electronic components to gather data that is shareable with other devices, e.g., via a network. The other devices may also provide data to the portable eyewear devices.

There is room for improvement in providing status or functional notifications to a wearer of portable eyewear devices.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that such details are not necessary to practice the present teachings. In other instances, well-known methods, procedures, components, and/or circuitry are described at a relatively high-level, without detail, in order to avoid unnecessarily obscuring aspects of the present teachings.

The term "coupled" refers to any logical, optical, physical or electrical connection, link or the like by which signals or light produced or supplied by one system element are imparted to another coupled element. Unless described otherwise, coupled elements or devices are not necessarily directly connected to one another and intermediate components that may modify, manipulate or carry the light or signals may separate elements or communication media.

The orientations of the eyewear device, associated components and/or any complete devices such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

An example eyewear device includes a frame, a temple connected to a lateral side of the frame, an array of light emitting diodes (LEDs) located on an inner surface of at least one of the frame or the temple within a peripheral view of a wearer when the eyewear device is worn, the array of LEDs including a plurality of LEDs that are individually illuminable to emit light patterns, a processor coupled to the eyewear device, and a memory accessible to the processor. The memory stores programming for execution by the processor and a plurality of notification patterns corresponding to the plurality of LEDs. Execution of the programming by the processor configures the eyewear device to perform functions, including functions to: identify an event for presentation to the wearer; select a notification pattern corresponding to the identified event from the plurality of notification patterns stored in the memory; and display the selected notification pattern to the wearer by selectively illuminating the plurality of LEDs.

Figure 1:
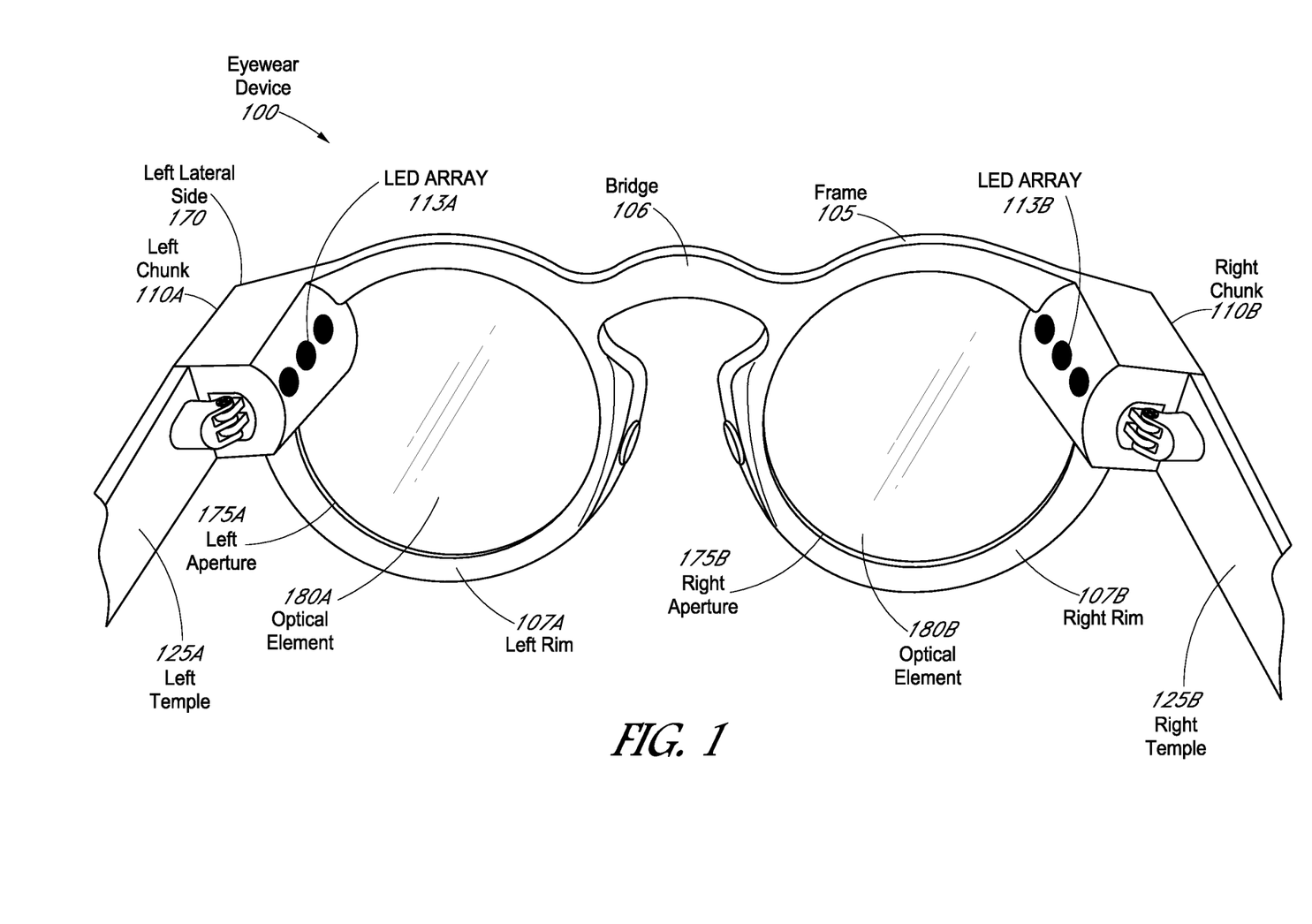
FIG. 1 is a rear view of an example hardware configuration of an eyewear device, which includes LED arrays on the chunks, for use in a system for providing notifications to a wearer of the eyewear.

FIG. 1 is a rear view of an example hardware configuration of an eyewear device 100, which includes LED arrays 113A and 113B on a frame 105, for use in a system for providing notifications to a wearer of the eyewear device 100. As shown in FIG. 1, the eyewear device 100 is eyeglasses. The eyewear device 100 can take other forms and may incorporate other types of frameworks, for example, a headgear, a headset, or a helmet.

In the eyeglasses example, eyewear device 100 includes a frame 105 having a left rim 107A and a right rim 107B. A bridge 106 connects the left and right rims 107A and 107B and is adapted to receive a nose of the wearer. The left and right rims 107A and 107B include respective apertures 175A and 175B, which hold respective optical elements 180A and 180B, such as a lens and/or a display device. As used herein, the term lens covers transparent or translucent pieces of glass or plastic having curved and/or flat surfaces that cause light to converge/diverge or that cause little or no convergence/divergence.

Although shown as having two optical elements 180A and 180B, the eyewear device 100 can include other arrangements, such as a single optical element or may not include any optical element 180A and 180B depending on the application or intended use of the eyewear device 100. As further shown, eyewear device 100 includes a left chunk 110A adjacent the left lateral side 170A of the frame 105 and a right chunk 110B adjacent the right lateral side 170B of the frame 105. The chunks 110A and 110B may be integrated into the frame 105 on the respective sides 170A and 170B (as illustrated), implemented as separate components attached to the frame 105 on the respective sides 170A and 170B, or omitted. Alternatively, the chunks 110A and 110B may be integrated into left and right temples 125A and 125B, respectively, attached to the frame 105.

The LED arrays 113A and 113B are located on an inner facing surface of a respective chunk such that they are visible to a wearer of the eyewear while wearing the eyewear device 100. The LED arrays 113A and 113B are a size that permits the wearer of the eyewear to distinguish the display in their peripheral view while wearing the eyewear device 100. The illustrated LED arrays 113A and 113B are a 1×3 matrix. The LED arrays may take other forms such as a 2×2 matrix, 3×3 matrix, 5×4 matrix, etc. The LED arrays 113A and 113B each include an arrangement of light sources such as light emitting diodes (LEDs) that are configurable in patterns to provide notification of a particular event to a wearer of the eyewear.

FIG. 1 depicts an LED array on each chuck of the eyewear. However, an LED array may be located on just one chunk 110A or 110B or may be positioned elsewhere (e.g., if there are no chunks). The left and right chunks 110A and 110B may include various circuit boards, such as printed circuit boards (PCBs) or flexible PCBs, that include controller circuits for interconnecting, for example, a processor, a battery, the inward facing LED arrays such as 113A or 113B, and/or outward (forward) facing LEDs. Solder, for example, connects the LED arrays 113A and 113B to the circuit board.

Eyewear device 100 couples to a processor and a memory (not shown in FIG. 1). The eyewear device 100 may include the processor and memory. Alternatively, the processor and/or memory may be located in another part of the system, e.g., in a mobile device such as a smartphone, tablet, or laptop computer in communication with the eyewear device 100. The processor and memory may process instructions or data received from an external device for notification and display by the LED arrays to provide notification of events (including guidance instructions) to the wearer of the eyewear device 100.

Figure 2:
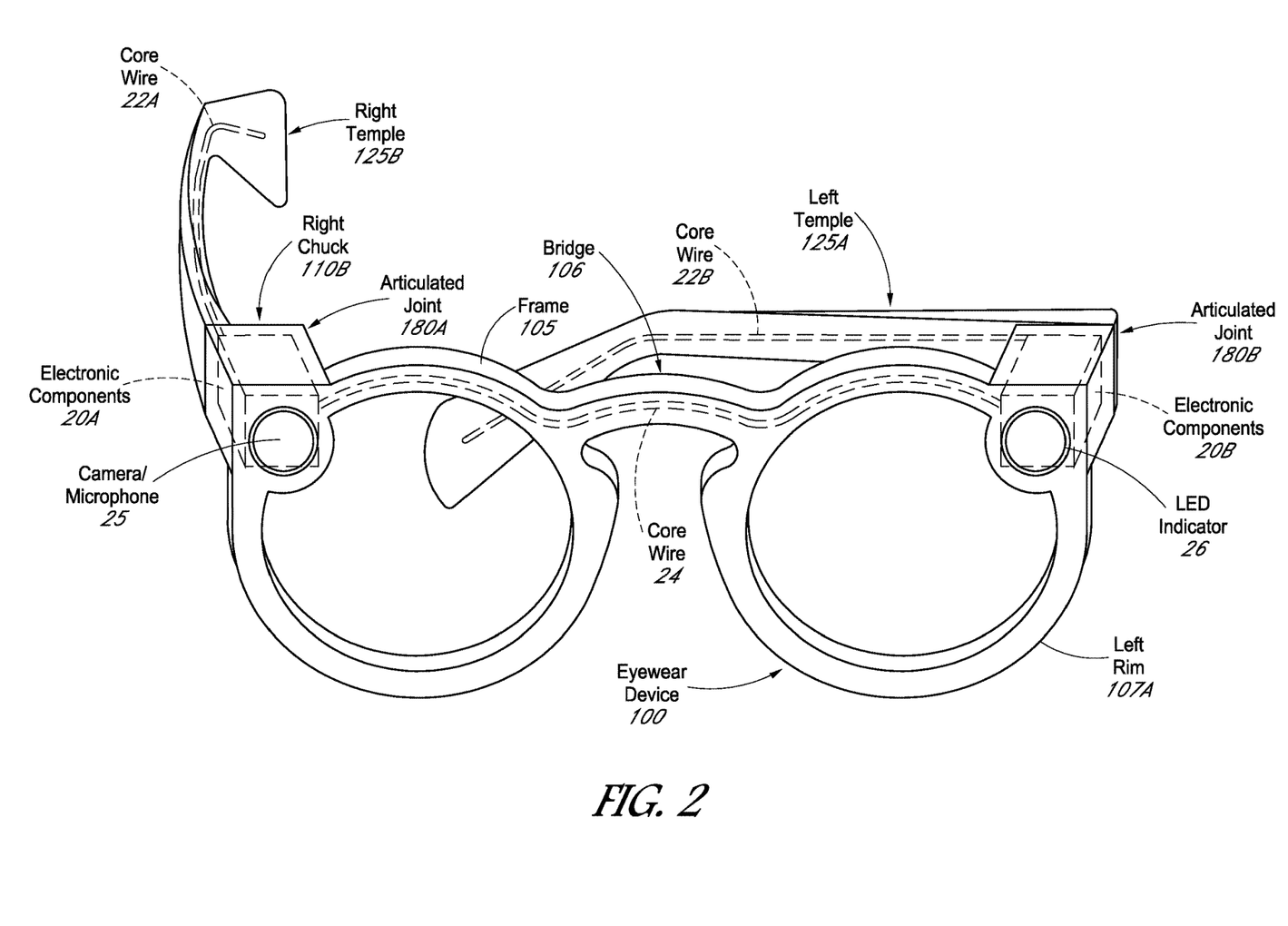
FIG. 2 is a front perspective view of the eyewear device of FIG. 1 depicting additional components of the eyewear device for use in a system for providing notifications to a wearer of the eyewear.

FIG. 2 is a front perspective view of the eyewear device 100 depicting additional components of the eyewear device for use in a system for providing notifications to a wearer of the eyewear device 100. The eyewear device 100 includes articulated joints 180A and 180B, electronic components 20A and 20B within the chunks 110B and 110A, respectively, and core wires 22A, 22B and 24. The core wires 22A and 22B extend longitudinally within the right and left temples 125B and 125A, respectively, and the core wire 24 extends along the upper portion of the frame 105 and through the bridge 106 area of the frame 105 from the left chunk 110A to the right chunk 110B.

FIG. 2 illustrates the right temple 125B in a wearable position and the left temple 125A in a collapsed position. The articulated joint 180A connects the right temple 125B to a right end portion of the frame 105 having the right chunk 110B. Similarly, the articulated joint 180B connects the left temple 125A to a left end portion of the frame 105 having the left chunk 110A.

Electronic components 20A and 20B housed inside the chunks 110B and 110A, respectively, may include a power source, power and communication related circuitry, communication devices, display devices, a computer, a memory, modules, and/or the like (not shown). Electronic components 20A and 20B may also include a camera/microphone 25 for capturing images and/or videos and/or audio, and indicator LEDs 26 positioned around a perimeter of the camera/microphone 25 to indicate an operational state of the camera/microphone 25 or the eyewear device 100.

In one example, a plastic material, cellulosic plastic (e.g. cellulosic acetate), an eco-plastic material, a thermoplastic material, or a material similar thereto in addition to the core wires 22A, 22B and 24 embedded therein may form the right temple 125B, the left temple 125A, and the frame 105. The core wires 22A, 22B and 24 provide structural integrity to frame 105 inclusive of the right temple 125B, the left temple 125A, and the bridge 106. Additionally, the core wires 22A, 22B and/or 24 act as a heat sink to transfer heat away from the electronic components 20A and 20B to reduce the likelihood of localized heating adjacent the electronic components 20A and 20B. A relatively flexible conductive metal or metal alloy material such as one or more of an aluminum, an alloy of aluminum, alloys of nickel-silver, and a stainless steel, for example, may be used to construct the core wires 22A and 22B and/or 24.

Flexible printed circuit boards (FPCBs) pass through various portions of the frame 105 and the temples 125A and 125B to connect electrically electronic components in the chunks or other areas of the eyewear device 100. For example, a FPCB in the right chunk 110B may pass through the frame 105 to interconnect electrically the electronic components 20A and 20B. Other FPCBs may pass through the frame 105 and the temples 125A and 125B. The use of other FBCBs enables embedding of other electronic devices (e.g., sensors) at various locations throughout the structure of the eyewear device 100.

The FPCBs in the eyewear device 100 include one or more electrical traces for carrying electrical signals between the electronic components and the sensors. The manufacturing process may embed these FPCBs in the frame and/or temples of eyewear device 100.

For example, a first shot of a two-shot molding process may inject plastic into a mold to form the front half of the frame 105 and/or the temples 125A and 125B. After forming the front halves, manufacturing equipment inserts and positions the FPCBs, along with other electronic components, within the mold at various locations with respect to the front halves. A second shot of the two-shot molding process may inject more plastic into the mold to cover the components and form the back half of the frame 105 or the temples 125A and 125B, and to embed the FPCBs and the electronics between the front and back halves of the frame 105 and/or the temples 125A and 125B. After formation of the frame and both temples using the molding process, connectors (e.g., screws) mechanically connect the frame to both temples to form the finished eyewear device 100.

Figure 3A:
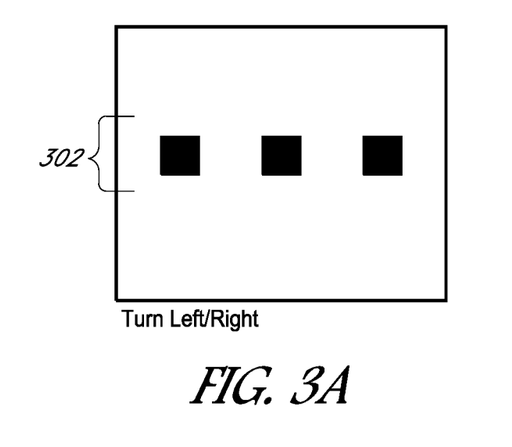
FIGS. 3A, 3B, 3C, and 3D are examples of patterns for LED arrays for providing notifications to a wearer of the eyewear device in the system of FIG. 1.

FIGS. 3A, 3B, 3C, and 3D illustrate example notification patterns for presentation on a 3×3 LED array for providing notifications to a wearer of an eyewear device such as the eyewear device 100 with LED arrays 113A and 113B having a 3×3 matrix arrangement. The LED arrays may present the patterns in a continuous or blinking manner, in different colors, or a combination thereof. In FIG. 3A, the pattern is a horizontal pattern 302 providing notifications, for example, instructions to turn/walk left or right based upon data from, for example, a global positioning satellite (GPS) and/or other directional guidance software application(s). An LED array may present the pattern 302 on an inner surface of the chunk for which the notifying direction corresponds. For example, the LED array on the inner surface of the left chuck 110A may present the horizontal pattern 302 to provide a notification to turn left, and the LED array on the inner surface of the right chuck 110B may present the horizontal pattern 302 to provide a notification to turn right.

Figure 3B:
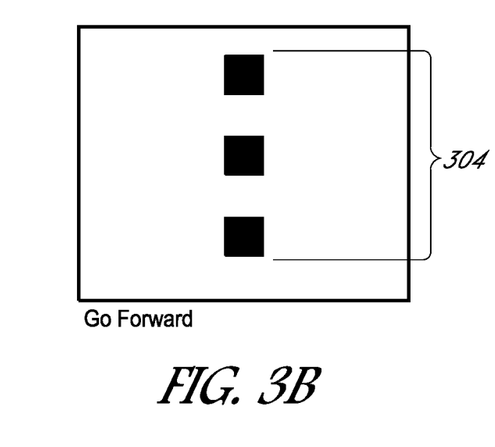

In FIG. 3B, the pattern is a vertical pattern 304, e.g., to notify the wearer to walk or look in a forward direction. One or both of the inner surface of the chunks 110A and 110B may display the vertical pattern 304.

Figure 3C:
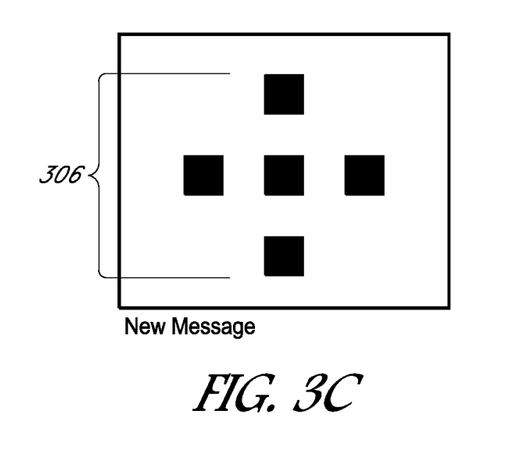

In FIG. 3C, the pattern is a "plus" symbol 306, e.g., to notify the wearer of a received message, for example, an application message, e.g., an email message or other electronic communication awaiting review by the wearer (e.g., on a paired mobile device such as a cellular telephone).

Figure 3D:
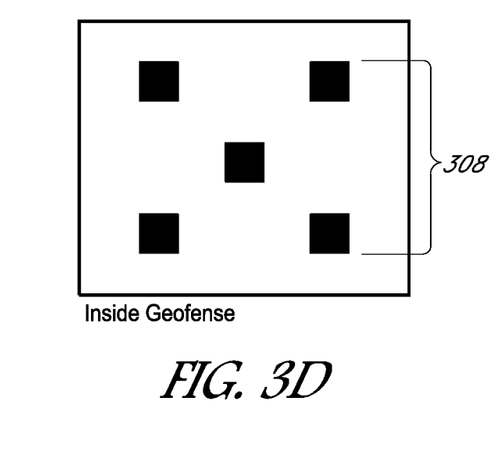

In FIG. 3D, the pattern is a "crisscross" symbol 308, e.g., to notify a wearer of the eyewear device 100 that the wearer is inside or near a geofence area. A geofence is a virtual geographic boundary. A global positioning system (GPS) or radio frequency identification (RFID) technology may define the boundary and enable software to trigger a response when a mobile device, for example, the eyewear device 100 (or another device such as a cellular telephone paired to the eyewear device 100), enters or leaves a particular area. The geofence area may indicate, for example, retail marketing space, tourist sites, or other points-of-interest. Additionally, the eyewear device 100 may guide a wearer in a particular manner based on their location and orientation with respect to a point of interest.

Figure 4:
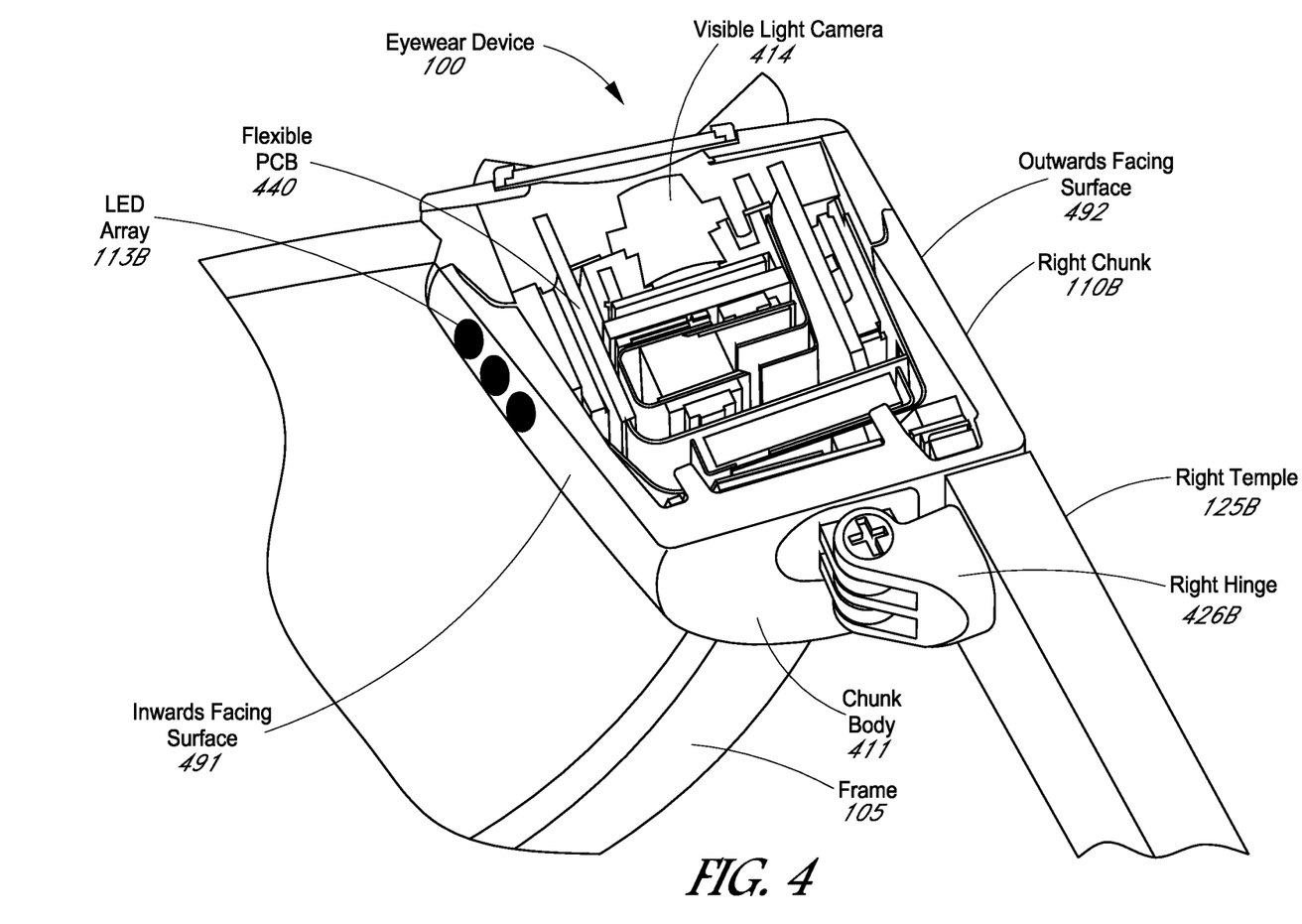
FIG. 4 is a top cross-sectional view of the chunk of the eyewear device of FIG. 1 depicting the LED array, and other electronic components of the chunk.

FIG. 4 is a top cross-sectional view of the right chunk 110B of the eyewear device 100 of FIG. 1. As shown, the eyewear device 100 includes an LED array 113B, a visible light camera 414, and a circuit board, which may be a flexible PCB 440. A right hinge 426B connects the right chunk 110B to a right temple 125B of the eyewear device 100. In some examples, components of the LED array 113B, the visible light camera 414, the flexible PCB 440, or other electrical connectors or contacts may be located on the right temple 125B or the right hinge 426B.

The right chunk 110B includes a chunk body 411, an inward facing surface 491, and an outward facing surface 492. The right chunk 110B also includes a chunk cap (not shown in FIG. 4 to permit description of the internal components) that covers or encloses the components within the right chunk 110B. Disposed inside the right chunk 110B are various interconnected circuit boards, such as PCBs or flexible PCBs, that include controller circuits for the visible light camera 414, microphone(s), low-power wireless circuitry (e.g., for wireless short range network communication via Bluetooth™), high-speed wireless circuitry (e.g., for wireless local area network communication via WiFi).

The visible light camera 414 is on a circuit board and has an outward facing field of view. A visible camera cover lens (not shown) may cover the visible light camera 414. A frame front, which connects to the right chunk 110B and/or the left chunk 110A may include opening(s) for the visible light camera cover lens. The frame front includes a front-facing side that faces outwards away from the eye of the wearer. The front-facing side defines an opening for the visible light camera cover lens. As shown in FIG. 4, the inward facing surface 491 of the right chunk 110B supports the LCD array 113B.

The LCD array 113B couples to the flexible PCB 440. For example, the flexible PCB 440 is present inside the right chunk 110B between the inwards facing surface 491 and the outwards facing surface 492 of the right chunk 110B. The flexible PCB 440 couples to one or more other components within the right chunk 110B. Although shown on the circuit board of the right chunk 110B, the LED array 113B can be on the circuit board of the left chunk 110A.

Figure 5:
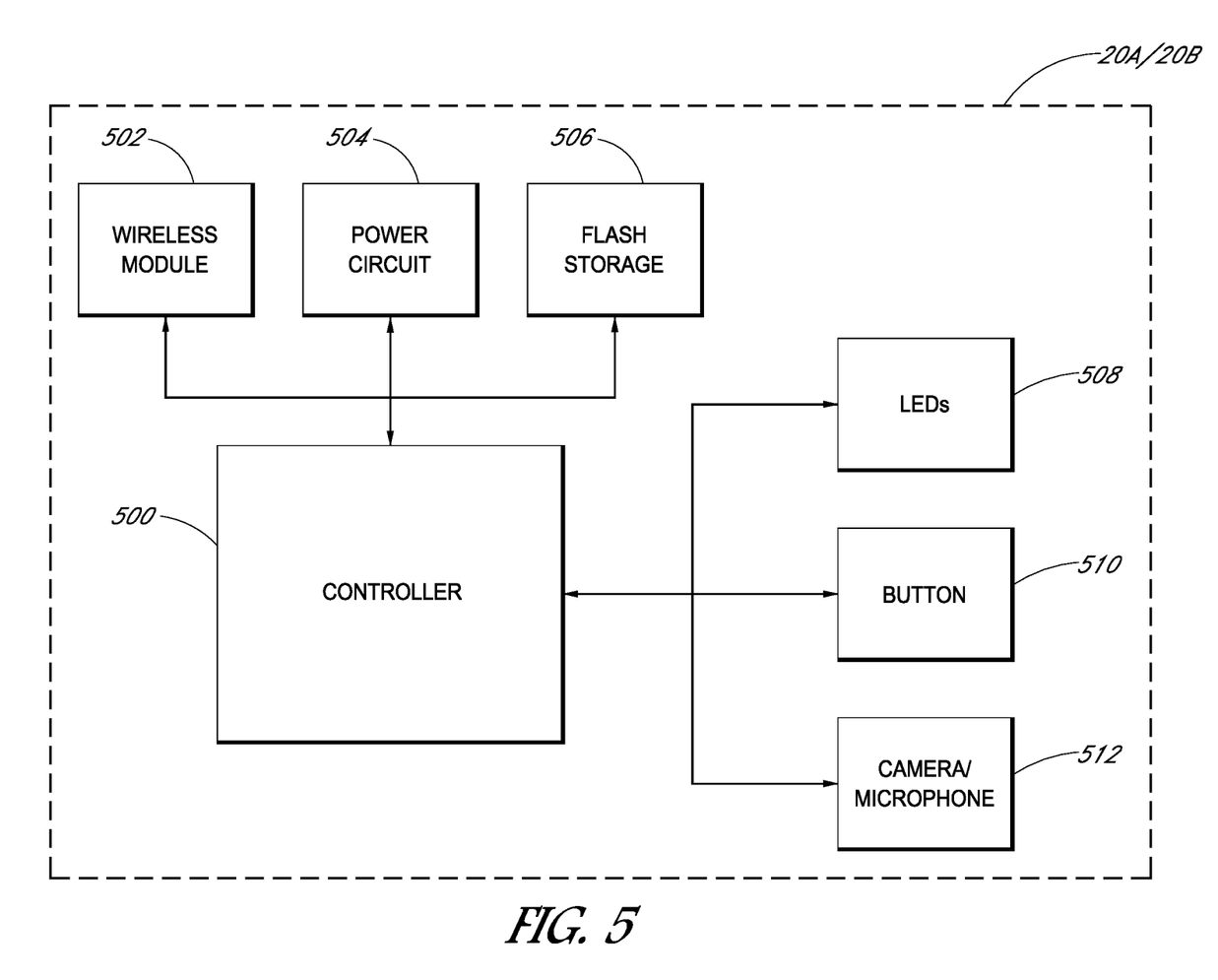
FIG. 5 is a block diagram of an example of the electronic components supported by the eyewear device of FIG. 1.

FIG. 5 is a block diagram of example electronic components 20A, 20B (FIG. 2) including the LED arrays 113A and 113B (FIG. 1) within one or both of the chunks 110A and 110B (FIGS. 1 and 2). The electronic components within the chunks 110A, 110B include the controller 500 (e.g., lower power processor, image processor, etc.) for controlling components in the eyewear device 100, wireless module (e.g., Bluetooth™) 502 for communication between the eyewear device 100 and a client device (e.g., mobile device), power circuit 504 (e.g., battery, filter, etc.) for powering eyewear device 100, flash storage 506 for storing data (e.g., images, video, image processing software, etc.), LEDs 508 which includes the LED arrays 113A, 113B and the LED indicator 26 for providing notification to the wearer, and button 110 for triggering eyewear device 100 to capture images/video and sound.

Wireless module 502 may connect the eyewear device 100 with a mobile device such as a smartphone, tablet, laptop computer, desktop computer, network appliance, access point device, or other such device. A combination of Bluetooth™, Bluetooth Low Energy, WiFi, cellular modem, and a near field communication system, as well as multiple instances of any of these systems may implement these connections. Communication may include transferring, for example, software updates, images, videos, and/or sounds between the eyewear device 100 and the mobile device (e.g., images captured by the eyewear device 100 may be uploaded to a smartphone, notifications received by the smartphone may be sent to the eyewear device 100, etc.).

Camera/microphone 512 captures images/video. The camera/microphone 512 may include digital camera elements such as a charge-coupled device, a lens, or other light capturing elements for capturing image data. The camera/microphone 512 includes a microphone having a transducer for converting sound into an electrical signal.

The button 510 may be a physical button that, when pressed, sends a user input signal to the controller 500. Controller 500 may interpret pressing button 510 for a predetermined period of time (e.g., three seconds) as, for example, a request for battery status information.

The controller 500 controls the electronic components 20A/20B. For example, controller 500 includes circuitry to receive signals from camera 512 and process those signals into a format suitable for storage in flash storage/memory 506.

In one example, controller 500 includes a microprocessor integrated circuit (IC) for processing notification data from, for example, an external device or flash storage 506, along with volatile memory used by the microprocessor to operate. The memory may store software code for execution by controller 500. For example, the software code may instruct controller 500 to perform one or more of the functions of the eyewear device 100 described herein.

Each of the electronic components require power to operate. Power circuit 504 may include a battery (not shown), power converter and distribution circuitry (not shown). The battery may be a rechargeable battery such as a lithium-ion or the like. Power converter and distribution circuitry may include electrical components for filtering and/or converting voltages for powering the various electronic components.

The LEDs 508, among other uses discussed above with respect to the LED arrays 113A, 113B, may act as indicators 26 on eyewear device 100 to indicate one or more functions. For example, the LEDs 508 may illuminate each time the wearer presses button 510 to indicate the eyewear device 100 is recording images and/or video and/or sound. These LEDs may be a front view LED indicator 26 (FIG. 2).

Figure 6:
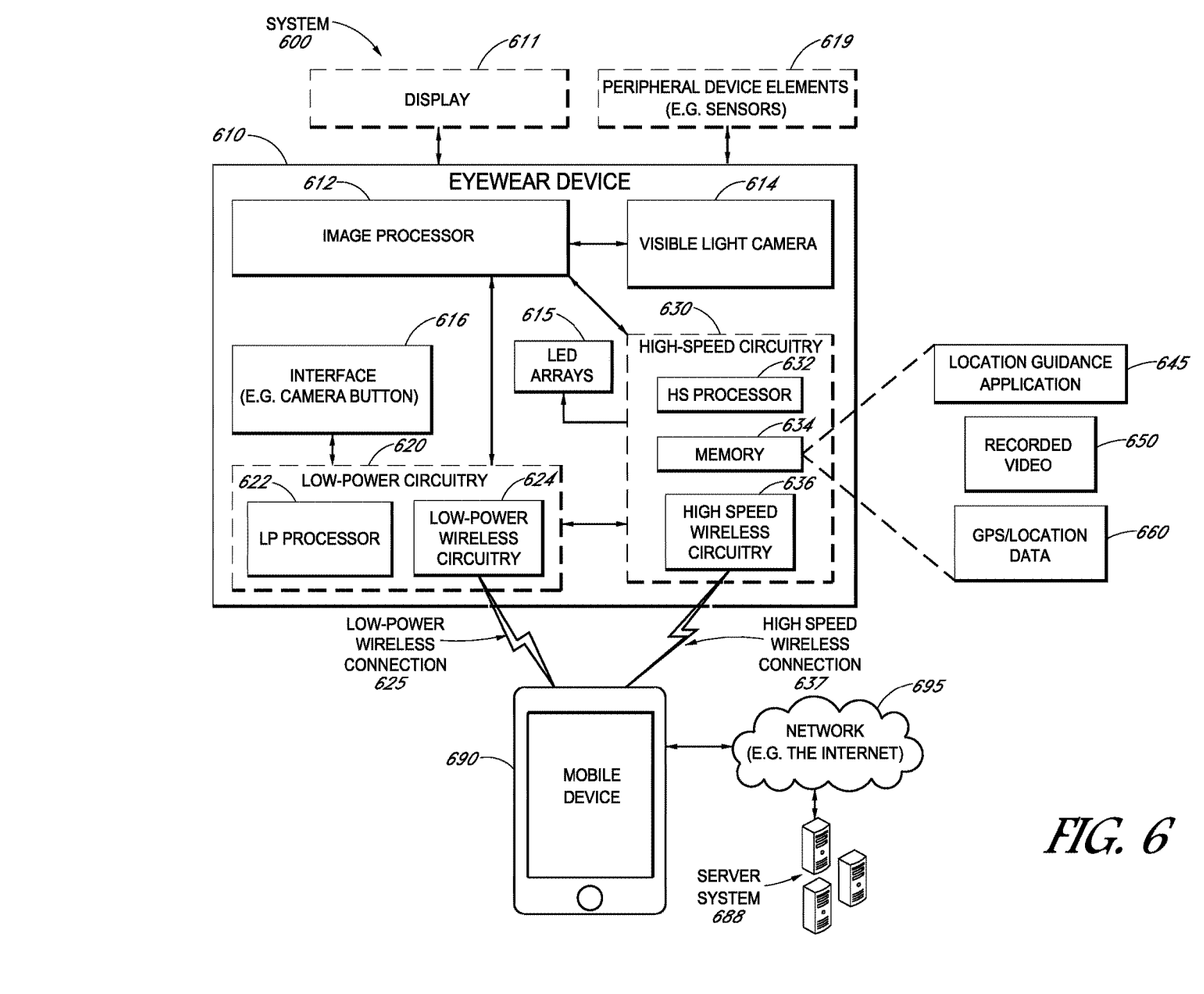
FIG. 6 is a functional block diagram of an example eyewear wearer notification system including an eyewear device, a mobile device, and a server system connected via various networks.

FIG. 6 is a functional block diagram of an example eyewear wearer notification system 600. The system 600 includes eyewear device 610 (such as eyewear device 100; FIG. 1), mobile device 690, and server system 688. Mobile device 690 may be a smartphone, tablet, laptop computer, access point, or any other such device capable of connecting with eyewear device 610 using a low-power wireless connection 625 and/or a high-speed wireless connection 637. Mobile device 690 connects to server system 688 and network 695. The network 695 may include a combination of wired and wireless connections.

Server system 688 may be one or more computing devices as part of a service or network computing system, for example, that include a processor, a memory, and network communication interface to communicate over the network 695 with the mobile device 690 and/or eyewear device 610. Execution of the programming by the processor of the server system 688 causes the server system 688 to perform some or all of the functions described herein, for example, provide notifications via LED arrays of events to a wearer of the eyewear device 610.

System 600 may include additional peripheral device elements 619 and/or a display 611 integrated with eyewear device 610. Such peripheral device elements 619 may include display elements integrated with eyewear device 610 and I/O components including motion components, position components, or other elements such as those described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such location coordinates can also be received over wireless connections 625 and 637 from the mobile device 690 via the low-power wireless circuitry 624 or high-speed wireless circuitry 636.

Eyewear device 610 includes a visible light camera 614, LED arrays 615, image processor 612, interface 616, low-power circuitry 620, and high-speed circuitry 630. The components shown in FIG. 6 for the eyewear device 610 are on one or more circuit boards, for example a PCB or flexible PCB, in the chunks, or in the frame. Alternatively, or additionally, the components can be in the temples, hinges, or bridge of the eyewear device 610.

The visible camera 614 may be a low resolution camera, such as VGA (640×480 resolution), which can provide for low power consumption since fewer pixels equals less power and also allows the camera module package to be small enough to fit into the design of the eyewear device 610, including the frame and chunks. Visible light camera 614 can include digital camera elements such as a charge-coupled device (CCD), a lens, or any other respective visible or light capturing elements that can capture data.

Interface 616 refers to any source of a user command for presentation to eyewear device 610. In one implementation, interface 616 is a physical button on a visible light camera 614 that, when pressed, sends a user input signal from interface 616 to low power processor 622. In some examples, the interface 616 is on different portions of the eyewear device 610, such as on a different chunk or the frame, but is coupled, e.g., via a circuit board, to the visible light camera 614. Low power processor 622 processes interaction with the interface by the wearer, e.g., tactile input or a depression of a button followed by an immediate release, as a request to capture a single image. The low-power processor 622 may process a depression of a camera button for a first period of time as a request to capture video data while the button is depressed, and to cease video capture when the button is released. Video captured while the button was depressed may be stored as a single video file. The low-power processor 622 may have a threshold time period between the press of a button and a release, such as 500 milliseconds or 1 second, below which the button press and release is processed as an image request, and above which the button press and release is interpreted as a video request.

Image processor 612 includes circuitry to receive signals from the visible light camera 614 and process the signals from the visible light camera 614 into a format suitable for storage in the memory 634. The memory 634 includes various images of video and audio recorded by the visible light camera 614. Memory 634 may also include notification patterns such as those depicted in FIGS. 3A-3D. In some examples, the memory 634 can also include a location guidance application 645 to perform location guidance to selected destinations or points-of-interest.

Low-power circuitry 620 includes low-power processor 622 and low-power wireless circuitry 624. The elements of low-power circuitry 620 may be implemented as separate elements or may be implemented on a single IC as part of a system on a single chip. Low-power processor 622 includes logic for managing the other elements of the eyewear device 610. As described above, for example, low power processor 622 may accept input signals from an interface 616. Low-power processor 622 may also be configured to receive input signals or instruction communications from mobile device 690 via low-power wireless connection 625. Additional details related to such instructions are described further below. Low-power wireless circuitry 624 includes circuit elements for implementing a low-power wireless communication system via a short-range network. Bluetooth™ Smart, also known as Bluetooth™ low energy, is one standard implementation of a low power wireless communication system that may be used to implement low-power wireless circuitry 624. Other low power communication systems may be used.

High-speed circuitry 630 includes high-speed processor 632, memory 634, and high-speed wireless circuitry 636. In the example, the high-speed processor 632 operates the LED arrays 615 coupled to the high-speed circuitry 630. It should be understood that in some examples low-power processor 622 can operate the LED arrays 615 coupled to the low-power circuitry 620.

High-speed processor 632 may be a processor capable of managing high-speed communications and operation of a general computing system needed for eyewear device 610. High speed processor 632 includes processing resources for managing high-speed data transfers on high-speed wireless connection 637 to a wireless local area network (WLAN) using high-speed wireless circuitry 636. The high-speed processor 632 may execute an operating system such as a LINUX operating system or other such operating system. In addition to other responsibilities, the high-speed processor 632 executing a software architecture for the eyewear device 610 may manage data transfers with high-speed wireless circuitry 636. The high-speed wireless circuitry 636 may implement Institute of Electrical and Electronic Engineers (IEEE) 802.11 communication standards, also referred to herein as Wi-Fi. High-speed wireless circuitry 636 may implement other high-speed communications standards.

Memory 634 includes a storage device capable of storing notification patterns and camera data from the visible light camera 614 and the image processor 612. While memory 634 is shown as integrated with high-speed circuitry 630, memory 634 may be an independent standalone element of the eyewear device 610. Electrical routing lines may provide a connection through a chip that includes the high-speed processor 632 from the image processor 612 or low-power processor 622 to the memory 634. The high-speed processor 632 may manage addressing of memory 634 such that the low-power processor 622 will boot the high-speed processor 632 when a read or write operation involving memory 634 is necessary.

Figure 7:
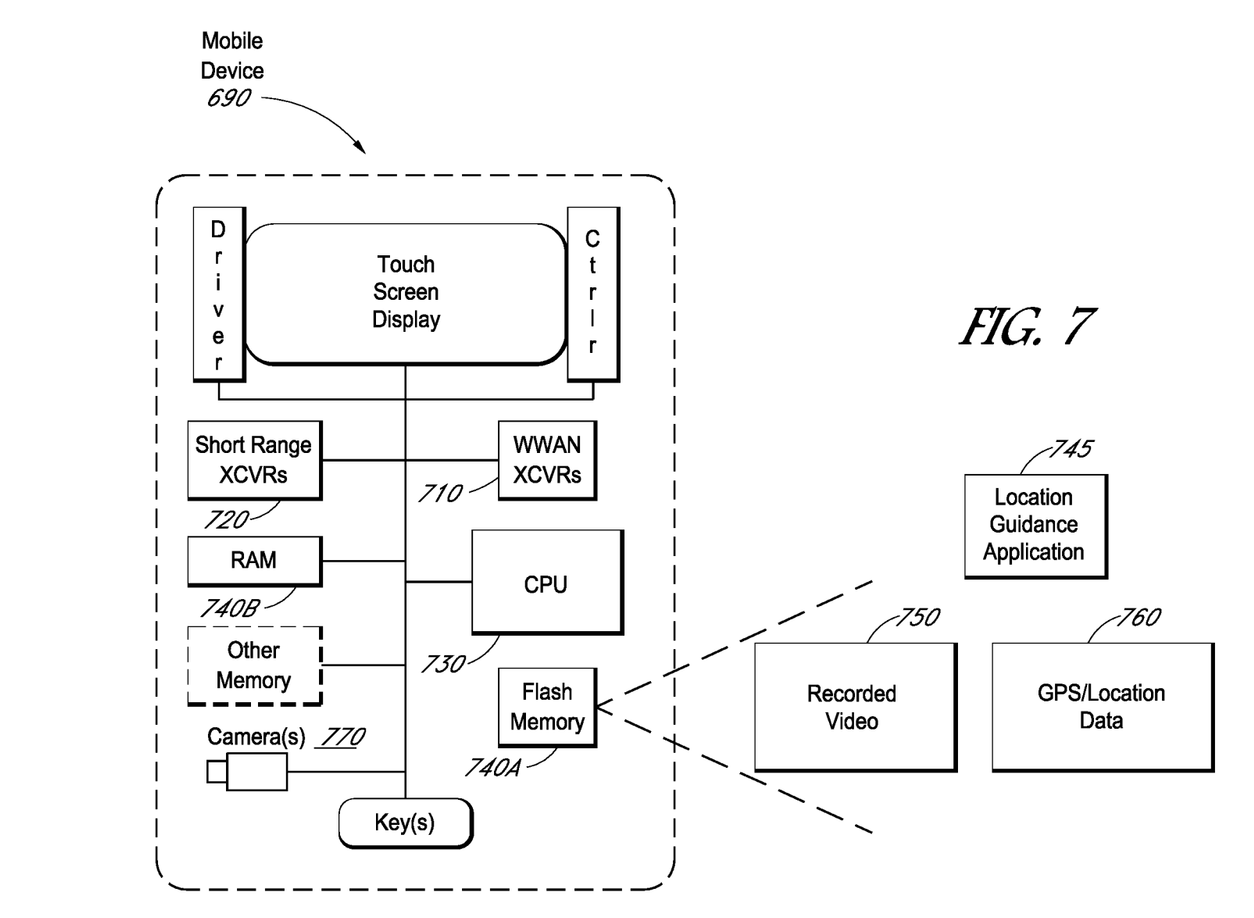
FIG. 7 shows an example of a hardware configuration for a mobile device that communicates with the eyewear device including the eyewear notification system of FIG. 6, in simplified block diagram form.

FIG. 7 is a functional block diagram of an example of a hardware configuration for a mobile device that communicates with the eyewear device including a wearer notification system of FIG. 6. Shown are elements of a touch screen type of mobile device 690 having, for example, a location guidance application 745 loaded, although other non-touch type mobile devices can be used in the wearer notification communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 7 therefore provides a block diagram illustration of the example mobile device 690 having a touch screen display for displaying content and receiving wearer input as (or as part of) the wearer interface. Mobile device 690 also includes a camera 770, such as visible light camera.

The activities that are the focus of discussions here typically involve data communications related to providing notification of receipt of a message, status levels, directional guidance regarding a point-of-interest, or location information for an eyewear device. As shown in FIG. 7, the mobile device 690 includes at least one digital transceiver (XCVR) 710, shown as WWAN XCVRs, for digital wireless communications via a wide area wireless mobile communication network. The mobile device 690 also includes additional digital or analog transceivers, such as short range XCVRs 720 for short-range network communication, such as via NFC, VLC, DECT, ZigBee, Bluetooth™, or WiFi. For example, short range XCVRs 720 may take the form of any available two-way wireless local area network (WLAN) transceiver of a type that is compatible with one or more standard protocols of communication implemented in wireless local area networks, such as one of the Wi-Fi standards under IEEE 802.11 and/or WiMAX.

To generate location coordinates for positioning of the mobile device 790, the mobile device 690 can include a global positioning system (GPS) receiver. Alternatively, or additionally the mobile device 690 can utilize either or both the short range XCVRs 720 and WWAN XCVRs 710 for generating location coordinates for positioning. For example, cellular network, WiFi, or Bluetooth™ based positioning systems can generate very accurate location coordinates, particularly when used in combination. The mobile device 690 may transmit the location coordinates to the eyewear device 610 over one or more network connections via XCVRs 720. It is contemplated that location components may be alternative or additionally located in the eyewear device 610.

The transceivers 710, 720 (network communication interface) conform to one or more of the various digital wireless communication standards utilized by modern mobile networks. Examples of WWAN transceivers 710 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 710, 720 provide two-way wireless communication of information including digitized audio signals, still image and/or video signals, web page information for display as well as web related inputs, and various types of mobile message communications to/from the mobile device 690 for wearer identification strategies.

Several of these types of communications through the transceivers 710, 720 and a network relate to protocols and procedures in support of communications with the eyewear device or the server system to provide notifications, via display of LED arrays, to a wearer of the eyewear device. Such communications, for example, may transport packet data via the short range XCVRs 720 over the wireless connections 625 and 637 to and from the eyewear device as shown in FIG. 6. Such communications, for example, may also transport packet data utilizing IP packet data transport via the WWAN XCVRs 710 over the network (e.g., Internet) 695 shown in FIG. 6. Both WWAN XCVRs 710 and short range XCVRs 720 connect through radio frequency (RF) send-and-receive amplifiers (not shown) to an associated antenna (not shown).

The mobile device 690 further includes a microprocessor, shown as CPU 730. A processor is a circuit having elements structured and arranged to perform one or more processing functions, typically various data processing functions. Although the examples utilize components forming a programmable CPU, another implementation may utilize discrete components. A microprocessor for example includes one or more integrated circuit (IC) chips incorporating the electronic elements to perform the functions of the CPU. The processor 730, for example, may be of any known or available microprocessor architecture, such as a Reduced Instruction Set Computing (RISC) using an ARM architecture, as commonly used today in mobile devices and other portable electronic devices. Of course, other processor circuitry may form the CPU 730 or processor hardware in a smartphone, laptop computer, and/or tablet.

The microprocessor 730 serves as a programmable host controller for the mobile device 690 by configuring the mobile device to perform various operations, for example, in accordance with instructions or programming executable by processor 730. For example, such operations may include various general operations of the mobile device, as well as operations related to wearer notification and communications with the eyewear device and server system.

The mobile device 690 includes a memory or storage device system, for storing data and programming. The memory system may include a flash memory 740A and a random access memory (RAM) 740B. The RAM 740B serves as short-term storage for instructions and data being handled by the processor 730, e.g., as a working data processing memory. The flash memory 740A typically provides longer-term storage.

Hence, in the example of the mobile device 690, the flash memory 740A stores programming or instructions for execution by the processor 730. Depending on the type of device, the mobile device 690 stores and runs a mobile operating system through which specific applications, including location guidance application 745. Applications, such as the location guidance application 745, may be a native application, a hybrid application, or a web application (e.g., a dynamic web page executed by a web browser) that runs on mobile device 690 to provide directional guidance and location information for points of interest to the wearer of the eyewear device. Examples of mobile operating systems include Google Android, Apple iOS (I-Phone or iPad devices), Windows Mobile, Amazon Fire OS, RIM Black-Berry operating system, or the like.

As shown, flash memory 740A storage device stores recorded video and audio data, and GPS or guidance and location related data. The recorded video and audio data can be, for example, messages associated with an application for receipt by a wearer of the eyewear device. Alternatively, the GPS and guidance or location related data can be data related to a current position of the eyewear device and/or its proximity to a point-of-interest where the point-of-interest includes a tourist attraction, a store, or a person.

The mobile device 690 is just one type of a host computer in the system for providing notifications to a wearer of an eyewear device and one of skill in the art will recognize other suitable arrangements.

Figure 8:
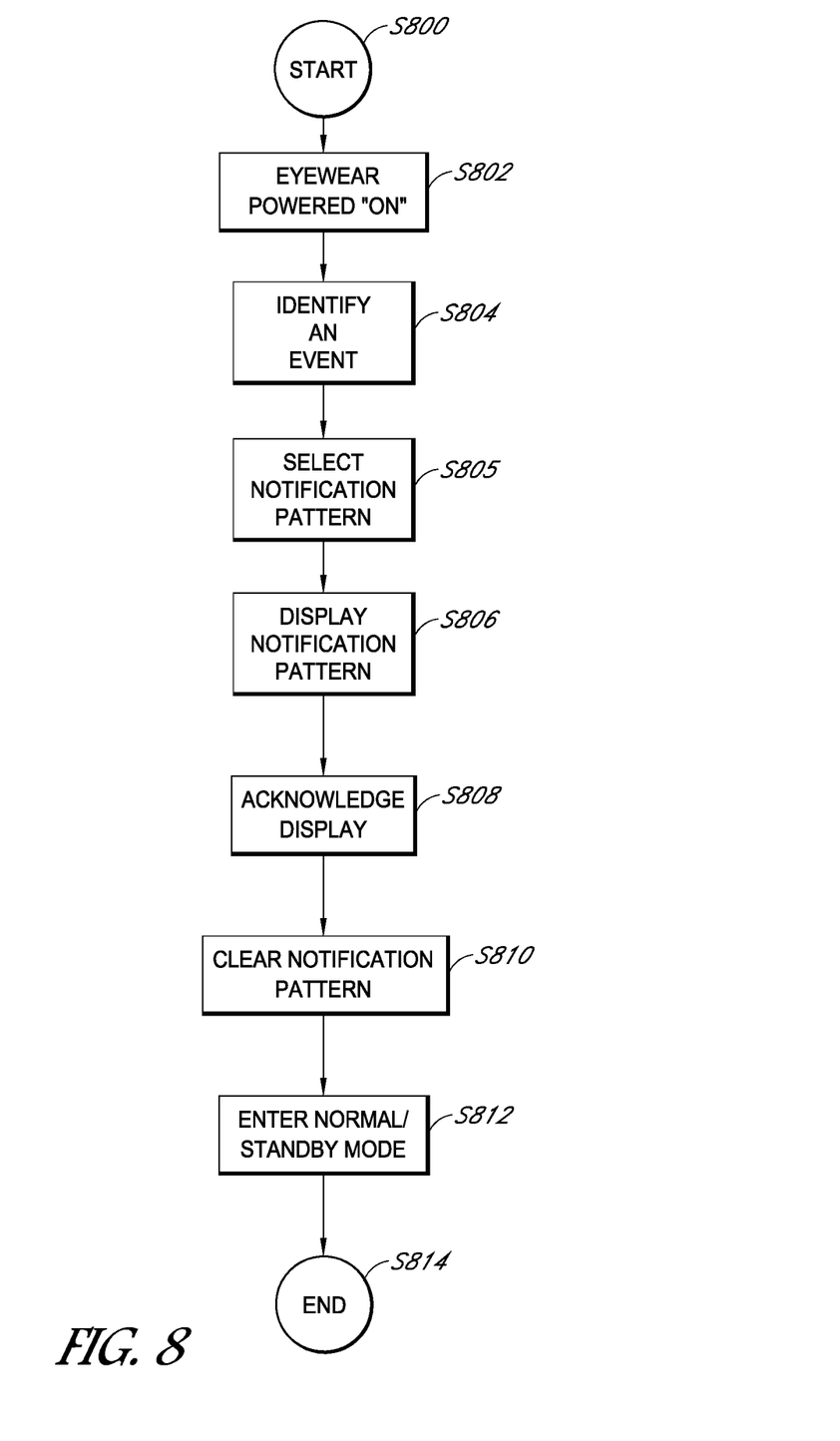
FIG. 8 is a flowchart showing an example of the use of LED arrays to provide a message notification to a wearer of the eyewear device.

FIG. 8 is a flowchart of a notification example using LED arrays to provide a notification of message receipt to a wearer of an eyewear device. The process starts at step S800. A description of the flowchart with reference to the eyewear device 100 follows. One of skill in the art will recognize other types of suitable eyewear.

At step S802, the eyewear device 100 is powered "on." In an example, the eyewear device is powered "on" by the controller 500 in response to a wearer pressing button 510 for a predefined period of time (e.g., three seconds). Upon powering "on," the controller 500 may initiate a pairing sequence to pair the eyewear device 100 with a mobile device 690 via the wireless module 502 to establish a communication link between the eyewear device 100 and the mobile device 690. Additionally, controller 500 may access and open an application(s) such as a video messaging application from a memory or flash storage 506. Controller 500 may run the application in the background operation of the eyewear device 100. Mobile device 690 may also open an application(s) in memory 634, one or more of which may correspond to the application(s) opened by the controller 500.

Identification of an occurrence of an event for notification to the wearer occurs at step S804. For example, in a messaging context, the event may be receipt of a message. In an example, the eyewear device 100 includes a messaging application running on the controller 500 and the messaging application identifies receipt of a message. In another example, a mobile device 690 coupled to the eyewear device includes a messaging application running on the CPU 730 of the mobile device 690. In this example, the messaging application running on the mobile device 690 may send a signal to the eyewear device 100 in response to receipt of a message and the eyewear device 100 may identify receipt of the message based on this signal. The application(s) continue to run in the background of the mobile device 690 and/or the eyewear device 100 to monitor for the occurrence of events such as receipt of electronic communications to the wearer of the eyewear device 100.

Selection of a notification pattern corresponding to the identified event occurs at step S805. Additionally, identification of a location for presentation of the notification pattern (e.g., on LED array 113A and/or LED array 113B) may also occur. In one example, the controller 500 of the eyewear device 100 may select the notification pattern from a plurality notification patterns stored in the memory 506 of the eyewear device 100. The memory 506 may store a lookup table including notification events and corresponding notification patterns (and presentation locations, e.g., the LED array 113A and/or the LED array 113B). The controller 500 may select the notification pattern (and the location for presentation) by comparing the notification event to the events in the lookup table and selecting the notification pattern (and presentation location) corresponding to a matching notification event. In another example, the mobile device 690 may identify and select the notification pattern (and optionally it location for presentation), which is then sent to the eyewear device 100 for display.

Display of the notification pattern occurs at step S806. The eyewear device 100 may display the notification pattern selected in step S805 on LED array 113A and/or LED array 113B (e.g., based on the identified location for presentation). For example, controller 500 of eyewear device 100 may control illumination of diodes in the appropriate LED array (e.g., LED array 113A and/or LED array 113B) to display the notification pattern.

At step S808, display of the notification pattern by the eyewear device is acknowledged/confirmed. In an example, the controller 500 of the eyewear device 100 acknowledges/ confirms display of the notification pattern, e.g., to the application responsible for the notification event, in preparation for display of another notification pattern corresponding to the next notification event. If the application is on the mobile device 690, the controller 500 may send a message to the mobile device 690 via the wireless module 502 confirming display of the notification pattern. In another example, the controller 500 directly or indirectly acknowledges/confirms display of the notification pattern in response to detection of an action by the wearer. The controller 500 of the eyewear device 100 may directly acknowledge/ confirm display of the notification pattern in response to a wearer pressing a button on the eyewear device 100. The controller 500 may indirectly acknowledge/confirm display of the notification pattern in response to receipt of a signal from the mobile device 690 indicating that the wearer has seen the notification pattern (e.g., detection of a wearer opening an application to see more in-depth context data associated with the notification).

Clearing of the current notification pattern occurs at step S810. The controller 500 of eyewear device 100 may clear the notification pattern (e.g., by turning off all LEDs of the array(s) or by selectively illuminating the LEDs of the array(s) with a new notification pattern). The controller 500 may clear the current notification after a predetermined period (e.g., 3 seconds), in response to the acknowledgement in step S808, in response to identification of a new notification event, and/or in response to signals received from the mobile device 690.

At step S812, a normal/standby mode is entered. The controller 500 may enter the normal/standby mode after clearing the notification pattern. In the normal/standby mode, the application(s) running in the background of the eyewear device 100 and/or mobile device 690 monitor for the occurrence of events for notification to the wearer of the eyewear device 100. The process ends at step S814.

Figure 9:
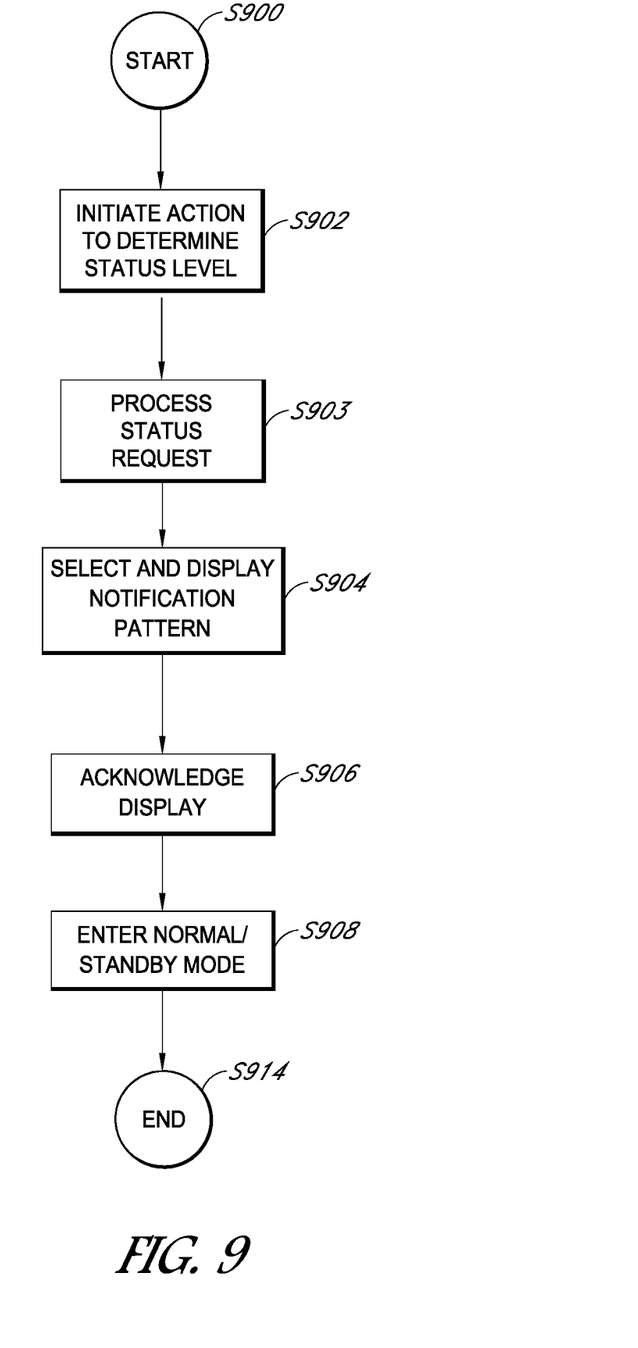
FIG. 9 is a flowchart showing an example of the use of LED arrays to provide a status of an electronic component to a wearer of the eyewear device.

FIG. 9 is a flowchart of a notification example using LED arrays to provide a status level event notification for an electronic component to a wearer of an eyewear device. For example, while wearing the eyewear device 100, a wearer of the eyewear device 100 may check the status of an electronic component that is accessible via controller 500. The status may include, e.g., battery charge level of the power circuit 504, a storage capacity of the memory in flash storage 506, or a countdown of time remaining to record video/audio using the camera/microphone 512. The process begins at step S900. The description of the flowchart is with reference to eyewear device 100. One of skill in the art will recognize other types of suitable eyewear.

At step S902, initiation of an action occurs to determine a status level event notification. The controller 500 may identify the event and, in turn, initiate the determination action is response to an action of the wearer of the eyewear device 100. For example, the wearer can tap or press button 510 in a predetermined pattern that corresponds to the desired status. For example, three quick presses of the button 510 may be an action the controller 500 determines to be a storage capacity status level request while a press and hold of the button 510 for five seconds may be an action the controller 500 determines to be a battery charge level request.

At step S903, processing of the request takes place. Controller 500 may process the request for the status level event notification by querying the appropriate electronic component(s) 20A/20B to determine the status level of the component. For example, controller 500 may communicate with power circuit 504 to determine a battery charge level, with the flash storage 506 to determine available memory, and/or with the camera/microphone 512 for the time remaining in a countdown for a recording.

Select and display of a notification pattern occurs at step S904. Selection of the notification pattern may be performed as described above for step 805. The eyewear device 100 may display the selected notification pattern on LED array 113A and/or LED array 113B (e.g., based on the identified location for presentation). Each illuminated LED 508 of the appropriate LED array may, for example, represent a remaining percentage of battery or memory available for use by the eyewear device 100 or each illuminated LED may represent a time remaining in a particular action (e.g., 10 seconds of time remaining to in a video and/or audio recording).

At step S906, display of the notification pattern by the eyewear device is acknowledged/confirmed. In an example, the controller 500 of the eyewear device 100 acknowledges/confirms display of the notification pattern in response to an action by the wearer, e.g., in response to tapping or depressing the button 510. For example, the controller may interpret a series of quick taps or pressing the button 510 for a predefined period (e.g., 3-5 seconds) as an acknowledgement/confirmation of the notification status.

At step S908, a normal/standby mode is entered. The controller 500 may enter the normal/standby mode in response to the acknowledgement in step 906. The controller 500 may additionally clear the notification pattern from the LED array prior to entering the normal/standby mode. The process ends at step S914.

Figure 10:
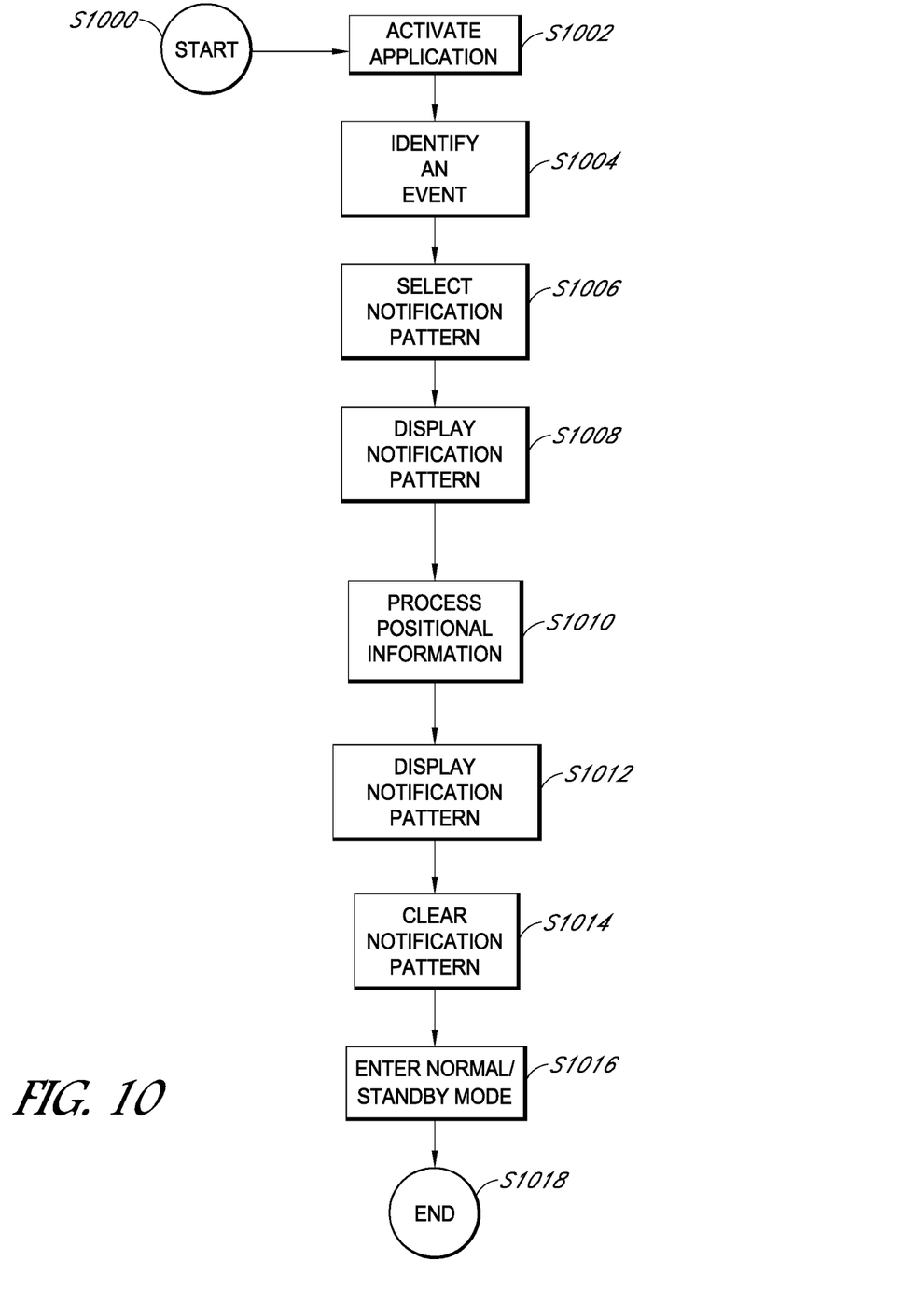
FIG. 10 is a flowchart showing an example of the use of LED arrays to provide contextual notifications to a wearer of the eyewear device.

FIG. 10 is a flowchart of a notification example using LED arrays to provide notifications to a wearer of the eyewear device. The notifications may include predetermined patterns to indicate a proximity of the wearer of the eyewear device 100 to a point-of-interest (such as a landmark or a friend) that is physically within a predetermined range (e.g., radius) of the eyewear device 100 and/or directions for reaching the point-of-interest. The process begins at step S1000. The description of the flowchart is with reference to eyewear device 100. One of skill in the art will recognize other types of suitable eyewear.

At step S1002, an application is accessed and opened. The controller 500 may access and open a software application such as a GPS or location guidance application 645. Alternatively, or additionally, a paired mobile device such as mobile device 690 may access and open the software application or a corresponding compatible software application. The software application may locate points of interests near the eyewear device 100, provide directional guidance to points of interest, and/or determine the location of the eyewear device relative to the point of interest. The memory 506 accessible by the controller 500 of the eyewear device 100 and/or the memory 740A accessible by the controller 730 of the mobile device 690 may store the software applications.

Identification of an event for notification to the wearer occurs at step S1004. For example, in a location/direction context, the event may be receipt of a signal from a software application identifying proximity of the eyewear device 100 to a point of interest, e.g., based on GPS location data. In an example, the eyewear device 100 includes a location/direction application running on the controller 500 and the location/direction application determines position and/or directional information based on information received from a remote server and GPS location information. In another example, a mobile device 690 coupled to the eyewear device includes such an application running on the CPU 730 of the mobile device 690. The application(s) continue to run in the background of the mobile device 690 and/or the eyewear device 100 to provide updates based on movement of the eyewear device 100 and/or paired mobile device 690 relative to the point-of-interest.

In an example, the controller 730 of mobile device 690, which is paired with the eyewear device 100, may monitor the location of the eyewear device 100 and periodically transmits the location to the server system 688. The server system 688 compares the received location data to a database of locations associated with points-of-interest to identify whether the eyewear device 100 is within a predefined threshold, for example, 100 yards, of one of the points-of-interest from the database. When the eyewear device 100 is within the predefined threshold of a point-of-interest, a signal may be sent to the eyewear device via the mobile device that results in generation of an event.

Selection of a notification pattern corresponding to the identified notification event occurs at step S1006. Additionally, identification of a location for presentation of the notification pattern (e.g., on LED array 113A and/or LED array 113B) may also occur. In one example, the controller 500 of the eyewear device 100 may select the notification pattern from a plurality notification patterns stored in the memory 506 of the eyewear device 100. The memory 506 may store a lookup table including notification events and corresponding notification patterns (and presentation locations). The controller 500 may select the notification pattern (and the location for presentation) by comparing the notification event to the events in the lookup table and selecting the notification pattern corresponding to a matching notification event. In another example, the mobile device 690 may identify and select the notification pattern (and optionally it location for presentation), which is then sent to the eyewear device 100 for display.

Display of the notification pattern occurs at step S1008. The eyewear device 100 may display the notification pattern selected in step S1006 on LED array 113A and/or LED array 113B (e.g., based on the identified location for presentation). For example, controller 500 of eyewear device 100 may control illumination of diodes in the appropriate LED array (e.g., LED array 113A and/or LED array 113B) to display the notification pattern.

At step S1010, processing of positional information occurs. The controller 500 of eyewear device 100 or the controller 730 of mobile device 690, which is paired with the eyewear device 100, may monitor the location of the eyewear device 100 relative to the point of interest and periodically determine the positional information.

Display of a notification pattern occurs at step S1012. Selection of the notification pattern may be performed as described above for step S805. The eyewear device 100 may display the selected notification pattern on LED array 113A and/or LED array 113B (e.g., based on the identified location for presentation). Notification patterns corresponding to positional/directional information may be displayed on the appropriate LED array 113A/113B to guide the wearer of the eyewear device 100 to the point of interest.

Clearing of the current notification pattern occurs at step S1014. The controller 500 of the eyewear device 100 may clear the notification pattern (e.g., by turning off all LEDs of the array(s) or by selectively illuminating the LEDs of the array(s) with a new notification pattern). The controller 500 may clear the current notification after a predetermined period (e.g., 3 seconds), in response to identification of a new notification event, and/or in response to signals received from the mobile device 690.

At step S1016, a normal/standby mode is entered. The controller 500 may enter the normal/standby mode after clearing the notification pattern. In the normal/standby mode, the application(s) running in the background of the eyewear device 100 and/or the mobile device 690 monitor for the occurrence of events for notification to the wearer of the eyewear device 100. The process ends at step S1018.

The steps in FIGS. 8-10 may be performed by the controller 500 of the eyewear device 100 having access to the electronic components 20A/20B upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 500 described herein, such as the steps in FIGS. 8-10, may be implemented in software code or instructions that are tangibly stored on a tangible computer medium. Upon loading and executing such software code or instructions by the controller, the controller may perform any of the functionality of the controller described herein, including the steps in FIGS. 8-10.

The term "application" or "applications" refers to program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising,". "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device, comprising:
a frame;
a temple connected to a lateral side of the frame;
an array of light emitting diodes (LEDs) located on an inner surface of at least one of the frame or the temple within a peripheral view of a wearer when the eyewear device is worn, the array of LEDs including a plurality of LEDs, arranged in a two-dimensional pattern, that are individually illuminable to emit light patterns;
a processor coupled to the eyewear device; and
a memory accessible to the processor, wherein the memory stores programming for execution by the processor and a plurality of notification patterns corresponding to the plurality of LEDs, the plurality of notification patterns including two-dimensional notification patterns; and
wherein execution of the programming by the processor configures the eyewear device to perform functions, including functions to:
identify an event for presentation to the wearer;
select at least one two-dimensional notification pattern corresponding to the identified event from the plurality of notification patterns stored in the memory; and
display the selected at least one two-dimensional notification pattern to the wearer by selectively illuminating the plurality of LEDs arranged in the two-dimensional pattern;
wherein the at least one two-dimensional notification pattern includes guidance directions comprising a horizontal patter and a vertical pattern, wherein the eyewear device receives guidance signals corresponding to the guidance directions to navigate a wearer of the eyewear device to a point-of-interest, and wherein the eyewear device displays the at least one two-dimensional notification pattern corresponding to the guidance directions using the horizontal pattern and the vertical pattern on the array of LEDs.

2. The eyewear device of claim 1, wherein the event includes identification of at least one of a battery charge level, an external communication, or a location guidance instruction.

3. The eyewear device of claim 1, further including a first chunk that is integrated into or connected to the frame, wherein the array of LEDs is located on the first chunk.

4. The eyewear device of claim 3, wherein the first chunk includes a circuit board that includes the array of LEDs.

5. The eyewear device of claim 4, further including a second chunk that is integrated into or connected to the frame and wherein:
the frame includes opposing first and second lateral sides;
the first chunk is connected to or integrated with the frame on the first lateral side;
the second chunk is connected to or integrated with the frame on the second lateral side; and
the circuit board extends through the frame from the first chunk to the second chunk.

6. The eyewear device of claim 4, wherein the circuit board is a flexible printed circuit board.

7. The eyewear device of claim 6, wherein:
the frame includes:
a frame front; and
a frame back;
wherein the flexible printed circuit board is disposed between the frame front and the frame back.

8. The eyewear device of claim 7, further including a visible light camera disposed on the circuit board, wherein:
the visible light camera has an outward facing field of view,
the frame front includes an opening for the visible light camera, and
the array of LEDs has an inward facing field of view relative to the visible light camera having the outward facing field of view.

9. The eyewear device of claim 1, wherein execution of the programming by the processor further includes a function to pair the eyewear device to a mobile device coupled to the eyewear device.

10. The eyewear device of claim 9, wherein execution of the programming by the processor further includes a function to receive the event from the mobile device.

11. The eyewear device of claim 10, wherein execution of the programming by the processor further includes a function to acknowledge the event received from the mobile device.

12. The eyewear device of claim 11, wherein the function to acknowledge the event includes sending an acknowledgement signal from the eyewear device to the mobile device.

13. The eyewear device of claim 9, wherein the event is identification of a social media notification received by the mobile device.

14. The eyewear device of claim 2, wherein the event of the location guidance instruction is an alert that the eyewear device is in a location within a predetermined range of a point-of-interest.

15. A method of notification for eyewear, comprising:
identifying an event for presentation to a wearer of the eyewear;
selecting at least one two-dimensional notification pattern corresponding to the identified event from a plurality of notification patterns stored in a memory of a processor coupled to the eyewear; and
displaying the selected at least one two-dimensional notification pattern to the wearer by selectively illuminating a plurality of light emitting diodes (LEDs), arranged in a two-dimensional pattern, located on an inner surface of at least one of a frame or a temple of the eyewear and within a peripheral view of the wearer of the eyewear;
wherein the at least one two-dimensional notification pattern includes guidance directions comprising a horizontal pattern and a vertical pattern, wherein the eyewear receives guidance signals corresponding to the guidance directions to navigate a wearer of the eyewear to a point-of-interest, and wherein the eyewear displays the at least one two-dimensional notification pattern corresponding to the received guidance signals using the horizontal pattern and the vertical pattern on the plurality of LEDs.

16. The method of claim 15, further comprising pairing the eyewear to a mobile device.

17. The method of claim 15, wherein the identifying the event includes identifying a status of at least one of a battery charge level of the eyewear, receipt of an external communication to the wearer, or a location guidance instruction.

18. The method of claim 17, wherein the event of the location guidance instruction is an alert that the eyewear is located within a predetermined range of a point-of-interest.

* * * * *